April 17, 1928. Re. 16,938
F. KLEINSMITH
OPERATING MEANS FOR AUTOMOBILE DOOR LATCHES
Original Filed Dec. 31, 1921
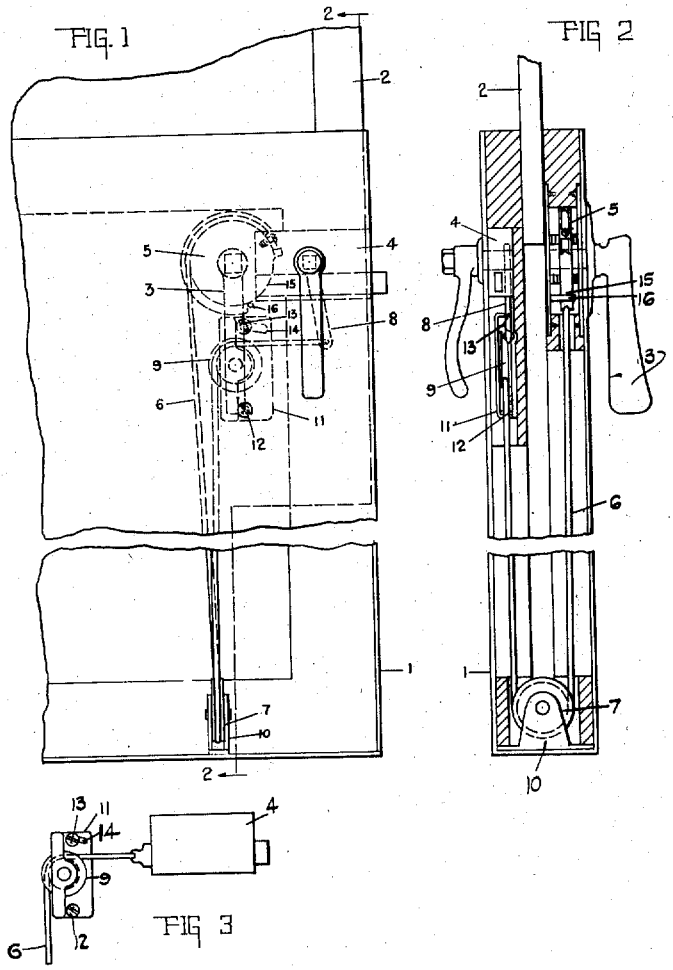
INVENTOR.
FREDERICK KLEINSMITH
BY John P. Tarbox
ATTORNEY.

Reissued Apr. 17, 1928. Re. 16,938

UNITED STATES PATENT OFFICE.

FREDERICK KLEINSMITH, OF INDIANAPOLIS, INDIANA, ASSIGNOR TO EDWARD G. BUDD MANUFACTURING COMPANY, OF PHILADELPHIA, PENNSYLVANIA, A CORPORATION OF PENNSYLVANIA.

OPERATING MEANS FOR AUTOMOBILE-DOOR LATCHES.

Original No. 1,484,031, dated February 19, 1924, Serial No. 526,188, filed December 31, 1921. Renewed October 19 1923. Application for reissue filed May 15, 1925. Serial No. 30,601.

This invention relates to operating means for door latches and is designed primarily for use in connection with doors in which is placed a sliding panel, the prime feature of the invention being in so arranging the latch operating mechanism that the panel may be formed substantially the same width as the door and pass between the latch operating handle on one side of the door and the latch.

The class of devices to which my invention belongs is exemplified in my United States Patent 1,348,882, August 10, 1920, automobile door latch. The class was originated by me and is characterized not only by the embodiment of a sliding panel substantially the same width as the door and its passage between the latch operating handle on one side of the door and the latch as aforesaid, but also by the fact that the path of movement of the sliding panel or extensible portion is upon a determinate path occupying substantially completely the width of the door, and the extension of the latch mechanism around the path of movement to inside and outside operating means for the latch mechanism carried by the door.

The outstanding feature of the present invention is the extension of the latch mechanism around the path of movement of the sliding panel or extensible portion by means having an operating movement of linear progression. Such means for extending the latch mechanism possesses the great advantages of extreme simplicity and very low cost of manufacture.

This feature of the invention is embodied in a flexible member which is extended from the operating handle at one side of the path of the panel to the latch positioned at the opposite side of the path of the panel for releasing the latch when the operating handle is actuated.

Still another feature is the operation of a latch on one side of the panel having a latching movement in a determinate line by means on the other side of the panel having an operating movement at an angle thereto.

And a further feature of the invention is the provision of means for taking up any slack or lost motion in the flexible member, thereby maintaining the flexible member at proper tension at all times.

Other objects and advantages will be hereinafter more fully set forth and pointed out in the accompanying specification.

In the accompanying drawings,

Figure 1 is a detail elevation partly in section of an automobile door showing the latch operating means attached thereto.

Figure 2 is a sectional view thereof as seen on line 2—2, Figure 1, and

Figure 3 is a side elevation showing a slightly different form of latch bolt operating device.

Referring to the drawings, 1 indicates an automobile door which is preferably hollow and in which is slidably mounted a frame or panel 2, said frame having a section of glass therein and is arranged to be raised or lowered for providing a closed or open car, or partially lowered for ventilating purposes.

In order to permit the frame to pass between the operating handle 3 on one side of the door and the latch 4 employed for holding the door in closed position, thereby providing a maximum width for the frame or panel, the pivoted end of the handle 3 has a drum 5 fixed thereto to which is attached a flexible member 6, said flexible member extending downwardly and around a sheave 7 and upwardly into engagement with a latch operating lever 8, a second sheave 9 being attached to the inner wall of the door over which the upper portion of that end of the flexible member attached to the lever 8 is extended. By extending the flexible member downwardly in the door 1 the frame 2 may be lowered until it is entirely seated within the door without interfering with the operation of the latch from either side of the door.

The sheave 7 (which is really a guide or bearing for the flexible member) is pivotally mounted in a yoke 10 and said yoke is secured independently of the remaining elements of the latch mechanism to the lower edge of the door or other relatively fixed structure in any suitable manner. The sheave 9 is mounted upon a plate 11 and the plate is attached to parts of the door structure by means of screws 12 and 13, the screw 12 extending through a round opening through the plate and preferably near one corner thereof, while the screw 13 extends through an elongated curved slot 14 on the opposite side of the sheave 9.

By securing the plate to the door in this manner, and placing the screw 13 substantially in line above the screw 12, the sheave 9 may be adjusted laterally for taking up any slack that may occur in the flexible member.

The rotating movement of the drum 5 may be limited by forming a notch 15 in the edge of the drum, with which co-operates a pin 16 carried by parts of the door structure.

In Figure 3 of the drawings the latch operating lever 8 is dispensed with and the end of the flexible member 6 connected direct to the end of the bolt in the latch 4, the sheave 9 in this instance being moved to a higher position on the door so as to cause an end pull on the latch bolt when the handle 3 is operated to release the door.

The outstanding characteristics and advantages of my invention are the same in each case, and of course may be realized in other embodiments of the invention. The flexible member 6 is characterized by a movement in linear progression from one side of the determinate path of movement of the sliding panel 2 to the other. A minimum number of jointed connections is thus necessary, and the movements (even those involving a change of direction) are of the most straight-forward character. The flexible member or equivalent device has an operating movement down in one direction on one side of the path of movement and in the opposite direction on the other side of the path of movement. The sheave 7 is really but a direction changing element of the simplest and most reliable character. The flexible member 6, together with the operating handle 3, and associated parts of the latch mechanism, constitute an extension of the operating means for the latch constituted by the lever 8, the latch mechanism being extended around the path of movement by the extension of the operating means. The latch 4 is of the sliding bolt type, and both it and the lever 8 have movement in a horizontal direction, whereas the flexible member 6, extending around the path of movement of the panel, has a movement in vertical directions. The sheave 9, like the sheave 7, is a direction changing device of the very simplest order. Such a direction changing device lends itself admirably to the embodiment of the means for taking up the slack or lost motion in the extended latch mechanism, merely by the provision of slot 14 which takes one of the two necessary securing screws 12 and 13 for the plate 11. Thus it will be seen that through these characteristics there is attained in full both great simplicity and small cost of manufacture.

All modifications of my invention possessing its outstanding characteristics should fall within the purview of the annexed claims.

Having thus fully described my said invention, what I claim as new and desire to secure by Letters Patent, is:

1. The combination with an automobile door having a sliding panel therein, of a latch at one side of the path of the panel, an operating handle at the opposite side of the path of said panel, a sheave in the lower portion of said door, and a flexible member extending from said handle to said latch and beneath said sheave for removing the flexible member from the path of the panel.

2. The combination with an automobile door having a sliding panel therein, of a latch on said door at one side of the path of said panel, a handle positioned at the opposite side of the path of said panel, a flexible member connecting said latch and handle and removed from the path of the panel, and means for removing slack from said flexible member.

3. The combination with an automobile door having a panel vertically slidable therein, of a latch at one side of the path of the panel and relatively near the top of the door, an operating handle at the opposite side of the path of said panel and substantially in a plane with said latch, a sheave in the lower portion of said door and below the path of said panel, and a flexible member attached at one end to said handle and at its opposite end to said latch, said flexible member passing below said sheave for removing the flexible member from the path of said panel when moved into said door.

4. The combination with an automobile door having a panel vertically slidable therein, of a latch at one side of the path of the panel, an operating handle at the opposite side of the path of said panel, a flexible member having one of its ends connected with said latch and its opposite end with said handle, a sheave in the lower portion of said door around which said flexible member extends for maintaining the flexible member out of the path of said panel, a second sheave near said latch over which said flexible member extends, a plate carrying said second sheave, and means for adjusting said plate and second sheave for taking up slack in said flexible member.

5. The combination with an automobile door having a panel vertically slidable therein, of a latch at one side of the path of the panel, an operating handle at the opposite side of the path of said panel, a flexible member having one of its ends connected with said latch and its opposite end with said handle, a sheave in the lower portion of said door around which said flexible member extends for maintaining the flexible member out of the path of said panel, a second sheave near said latch over which said flexible member extends, a plate carrying said second sheave, said plate having a circular opening and an elongated curved slot therethrough, and screws extending through said circular opening and curved slot whereby said plate and second sheave may be adjusted for taking up slack in said flexible member.

6. An automobile door having a lower hollow portion, an upper extensible portion movable into and out of the hollow thereof and having a determinate path of movement, a latch, and means for operating said latch, said operating means being extended around the path of movement of the extensible portion of the door by an element thereof which has a movement of linear progression in the general direction of its length.

7. An automobile door having a lower hollow portion, an upper extensible portion movable into and out of the hollow thereof and having a determinate path of movement, a latch, and latch-operating mechanism extended around the path of movement of said extensible portion by means of an element having movement on one side of the said path in one direction and at the same time on the opposite side of the said path a movement in the opposite direction.

8. An automobile door having a hollow lower portion, an upper extensible portion movable into and out of the hollow thereof and having a determinate path of movement, a latch, and latch-operating mechanism extended around the path of movement by means of an element having a movement of linear progression in one direction on one side of the path of movement and at the same time on the opposite side a movement in the opposite direction, and including in the extension a device anchored to a relatively fixed part for effecting a change in the direction of movement of said element.

9. An automobile door according to claim 6 in which the element having the movement of linear progression is a flexible element operating under tension applied through one of its ends.

10. An automobile door having a lower hollow portion, an upper extensible portion movable into and out of the hollow thereof and having a determinate path of movement, a latch, and means for operating said latch, said operating means comprising a continuous element extending around the path of movement of said extensible member and being substantially bodily movable to operate the latch.

11. An automobile door having a lower hollow portion, an upper extensible portion movable into and out of the hollow thereof and having a determinate path of movement, and a latch and latch operating means embodying a member extending around the path of movement of said extensible member and a support for said member having its axis extending generally in the direction of the plane of the door.

In testimony whereof I hereunto affix my signature.

FREDERICK KLEINSMITH.